(12) United States Patent
Challenger et al.

(10) Patent No.: US 7,143,026 B2
(45) Date of Patent: Nov. 28, 2006

(54) GENERATING RULES TO CONVERT HTML TABLES TO PROSE

(75) Inventors: James R. H. Challenger, Garrison, NY (US); Robert Filepp, Westport, CT (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 10/317,324

(22) Filed: Dec. 12, 2002

(65) Prior Publication Data

US 2004/0117739 A1    Jun. 17, 2004

(51) Int. Cl.
*G06F 17/28*    (2006.01)
(52) U.S. Cl. .................... 704/2; 704/3; 704/7
(58) Field of Classification Search ............ 704/2, 704/4, 7
See application file for complete search history.

(56) References Cited

U.S. PATENT DOCUMENTS

| | | | |
|---|---|---|---|
| 6,289,312 B1 * | 9/2001 | Raman | 704/270 |
| 6,865,578 B1 * | 3/2005 | Hays | 707/102 |
| 2003/0144886 A1 * | 7/2003 | Taira | 705/3 |

* cited by examiner

*Primary Examiner*—Tālivaldis Ivars Šmits
*Assistant Examiner*—Leonard Saint-Cyr
(74) *Attorney, Agent, or Firm*—F.Chau & Associates LLC

(57) ABSTRACT

A method for preparing rules used for generating text to describe structured data comprises providing a sample of structured data, and providing a text corresponding to the sample of structured data to a pattern matching learning engine, the text comprising at least one value from within the sample of structured data. The method further comprises organizing the text into a hierarchy of syntactic components, and building rules based on the text and the sample of structured data, wherein the rules define an organization of the hierarchy of syntactic components.

12 Claims, 10 Drawing Sheets

| ◇ | A | B | C | D | E |
|---|---|---|---|---|---|
| 1 | Cycling Track | | | | |
| 2 | Country | Gold | Silver | Bronze | Total |
| 3 | FRA | 4 | 2 | 0 | 6 |
| 4 | GER | 2 | 2 | 2 | 6 |
| 5 | AUS | 1 | 2 | 3 | 6 |
| 6 | GBR | 1 | 1 | 2 | 4 |
| 7 | NED | 1 | 1 | 0 | 2 |

| ◇ | A | B | C | D | E |
|---|---|---|---|---|---|
| 1 | Cycling Track | | | | |
| 2 | Country | Gold | Silver | Bronze | Total |
| 3 | FRA | 4 | 2 | 0 | 6 |

FIG. 5

Fra has 4 Gold medals, 2 Silver medals, 0 Bronze medals, and 6 Total medals.

FIG. 6

Fra(has)4 Gold(medals), 2 Silver(medals), 0 Bronze(medals)(and)6 Total(medals).

FIG. 7

| ◇ | A | B | C | D | E |
|---|---|---|---|---|---|
| 1 | Cycling Track | | | | |
| 2 | Country | Gold | Silver | Bronze | Total |
| 3 | FRA | 4 | 2 | 0 | 6 |

Fra has 4 Gold medals, 2 Silver medals, 0 Bronze medals, and 6 Total medals.

FIG. 8

GENERATING RULES TO CONVERT HTML TABLES TO PROSE

BACKGROUND OF THE INVENTION

1. Field of the Invention

The present invention relates to rendering of HTML tables, and more particularly to a method for converting HTML tables to prose according to a template.

2. Discussion of Related Art

Tables are used extensively in Web content design. Tables are generally used to accomplish one of two goals: to concisely convey data and data relationships to humans, or to effect formatting of content, for example to align columns of text in newspaper galley format.

Tables can be a very effective means of communication. However, table-based presentation becomes a liability when users are unable to actually see the information, as is the case for sight-impaired users who must rely on the aural rendition of content.

Visually rendered tables are persistent and nonlinear entities that can be studied at leisure. In contrast, aural presentations of tabular data need to proceed linearly and, since the spoken word is fleeting, have temporal constraints. Current methods to aurally render tabular information are unable to effectively deal with these constraints.

For example, the table of Olympic cycling results presented in FIG. 1 can be aurally rendered by a commercially available browser as follows: "Cycling Track Country Gold Silver Bronze Total FRA 4 2 0 6 GER 2 2 2 6 AUS 1 2 3 6 GBR 1 1 2 4 NED 1 1 0 2".

This rendition is difficult to understand, in part, because the data relationships are not explained or reinforced. The user needs to remember the sequence of column titles, "Gold", "Silver", "Bronze", and "Total", and must associate the numbers heard with the corresponding column titles.

This task can be difficult because the interval between the time a column heading is rendered and the time an actual value is rendered can be long. Linear presentation also tends to interweave column and row information, for example the row heading "FRA" follows the column heading "Total", obscuring or destroying context (e.g. making it difficult to associate "Bronze" with "0" correctly in the first row.)

Therefore, a need exists for a method of specifying rules for contextual reinforcement, ornamentation, cell content transformation, and traversal sequence.

SUMMARY OF THE INVENTION

According to an embodiment of the present invention, a method for preparing rules used for generating text to describe structured data comprises providing a sample of structured data, and providing a text corresponding to the sample of structured data to a pattern matching learning engine, the text comprising at least one value from within the sample of structured data. The method further comprises organizing the text into a hierarchy of syntactic components, and building rules based on the text and the sample of structured data, wherein the rules define an organization of the hierarchy of syntactic components.

The method comprises applying the rules to a structured data to generate a text description of the structured data, wherein the structured data is of a substantially similar type as the sample of structured data, and presenting the text description to a user.

The method further comprises storing the rules.

Organizing comprises determining values contained in the text which match values contained in the sample of structured data, and determining values contained in the text which do not match values the sample of structured data. Organizing further comprises aggregating the matched and unmatched values into phrase entities, aggregating similar phrase entities, and organizing the phrase entities into a hierarchy of phrase entities.

The method comprises preparing a graphical representation of the hierarchy of phrase entities.

According to an embodiment of the present invention, a method for preparing an example of text used to prepare rules for generating text to describe structured data comprises presenting a graphical representation of the sample of structured data to a user, providing a data entry facility to the user, and capturing example text entered into the data entry facility, wherein the example text corresponds to the sample of structured data.

The method comprises applying a standardized rule to the sample of structured data to generate an initial text description of the structured data, and presenting the initial text description to a user.

According to an embodiment of the present invention, a program storage device is provided, readable by machine, tangibly embodying a program of instructions executable by the machine to perform method steps for preparing rules used for generating text to describe structured data. The method comprises providing a sample of structured data, and providing a text corresponding to the sample of structured data to a pattern matching learning engine, the text comprising at least one value from within the sample of structured data. The method further comprises organizing the text into a hierarchy of syntactic components, and building rules based on the text and the sample of structured data, wherein the rules define an organization of the hierarchy of syntactic components.

BRIEF DESCRIPTION OF THE DRAWINGS

Preferred embodiments of the present invention will be described below in more detail, with reference to the accompanying drawings:

FIG. 5 is a portion of a table according to an embodiment of the present invention;

FIG. 6 is prose according to an embodiment of the present invention;

FIG. 7 is a diagram according to an embodiment of the present invention;

FIG. 8 is a diagram illustrating a mapping according to an embodiment of the present invention;

DETAILED DESCRIPTION OF PREFERRED EMBODIMENTS

According to an embodiment of the present invention a "Table to Prose Markup Language", (TTPML) enables content providers to specify rules to govern the prose rendition of tabular information. These rules provide for the contextual reinforcement, ornamentation, cell content transformation, and traversal sequence of tabular information. TTPML templates can be applied to preexisting or dynamic Web content and are reusable across multiple tables. The resulting prose can have many uses: Web page annotation, telephony applications, etc.

The TTPML can be an XML-compliant language that can be used by content providers to specify rules for contextual reinforcement, ornamentation, cell content transformation, and traversal sequence. Contextual reinforcement means that the context for specific cell variables is explained, for example, by placing the variable in proximity with a rendition of the appropriate row or column title. Ornamentation is the addition of authored text, used to form a grammatically correct rendition. Cell content transformation describes the application of preprocessing rules to alter the rendition of a cell variable. The traversal sequence of the table is the order in which the table content is rendered.

TTPML rules allow a user to define multiple regions of a table, wherein each region can be rendered by a different model. TTPML rules also-allow for the skipping of cells in the table.

TTPML uses the definition of a hierarchy of phrases used to control traversal of the table content. To facilitate the authoring of TTPML and development of templates including phrase hierarchies, an authoring tool can be implemented. The authoring tool learns "by example" (bottom-up inductive learning). An author can use the tool to prepare a model of the desired prose output associated with a sample table. The tool maps the modeled prose or example output to the sample table and generates an appropriate TTPML template. The TTPML template can be a reusable TTPML script.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figures 1, 2:
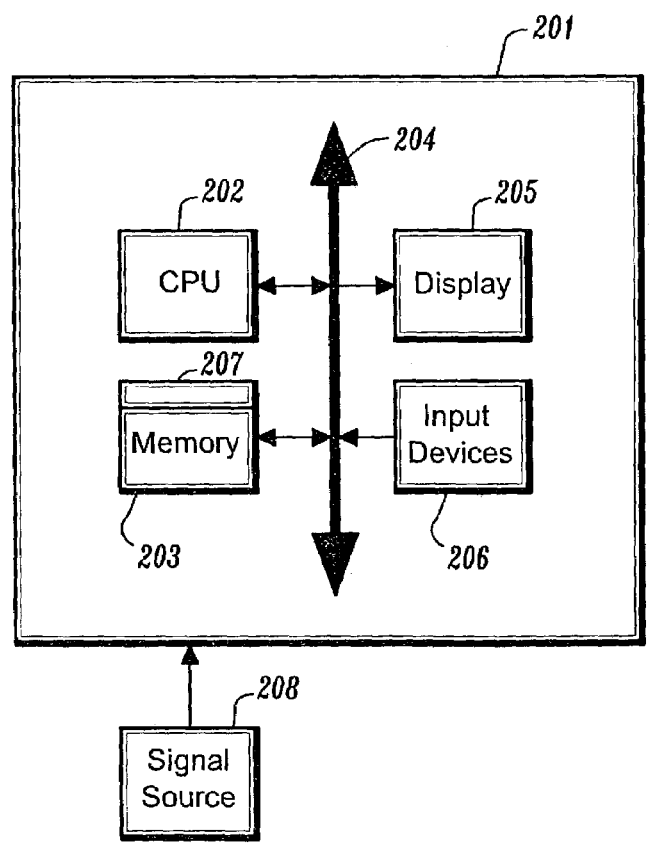
FIG. 1 is a table according to an embodiment of the present invention.
FIG. 2 is a diagram of a system according to an embodiment of the present invention.

Referring to FIG. 2, according to an embodiment of the present invention, a computer system 201 for implementing the present invention can comprise, inter alia, a central processing unit (CPU) 202, a memory 203 and an input/output (I/O) interface 204. The computer system 201 is generally coupled through the I/O interface 204 to a display 205 and various input devices 206 such as a mouse and keyboard. The support circuits can include circuits such as cache, power supplies, clock circuits, and a communications bus. The memory 203 can include random access memory (RAM), read only memory (ROM), disk drive, tape drive, etc., or a combination thereof. The present invention can be implemented as a routine 207 that is stored in memory 203 and executed by the CPU 202 to process the signal from the signal source 208. As such, the computer system 201 is a general purpose computer system that becomes a specific purpose computer system when executing the routine 207 of the present invention.

The computer platform 201 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

TTPML specifications (e.g., rules) can be used to convert HTML tables to prose descriptions. These descriptions can be converted to speech with text-to-speech tools, like ViaVoice®, and can be presented to users through aural interfaces. TTPML can improve accessibility to tabular information through aural interfaces. TTPML permits content providers to compose tabular content and external text into proper sentences with appropriate contextual reinforcement. TTPML also facilitates the customization of a table's prose description for various presentation contexts, for example, as commentaries for tables in transcoded pages. In addition, TTPML permits the integration of the Java Speech Grammar Specification (JSML) directives for pronunciation, which can further help improve the user's experience.

When using TTPML-based table-to-prose transformations, each HTML table is associated with a TTPML template. The HTML table can be parsed and its content combined into an output string according to its TTPML template. The output text comprises text from table cells, ALT attributes of images in table cells, and external text segments, called "ornaments".

The output text results from the concatenation and/or nesting of TTPML "phrases". The "phrase" is a basic TTPML abstraction. It corresponds to a table region for which all cells are transformed to prose by using the same model. The template comprises a sequence of cell content, ornaments and other phrases. The region can span from one cell to the entire table.

Figure 3:
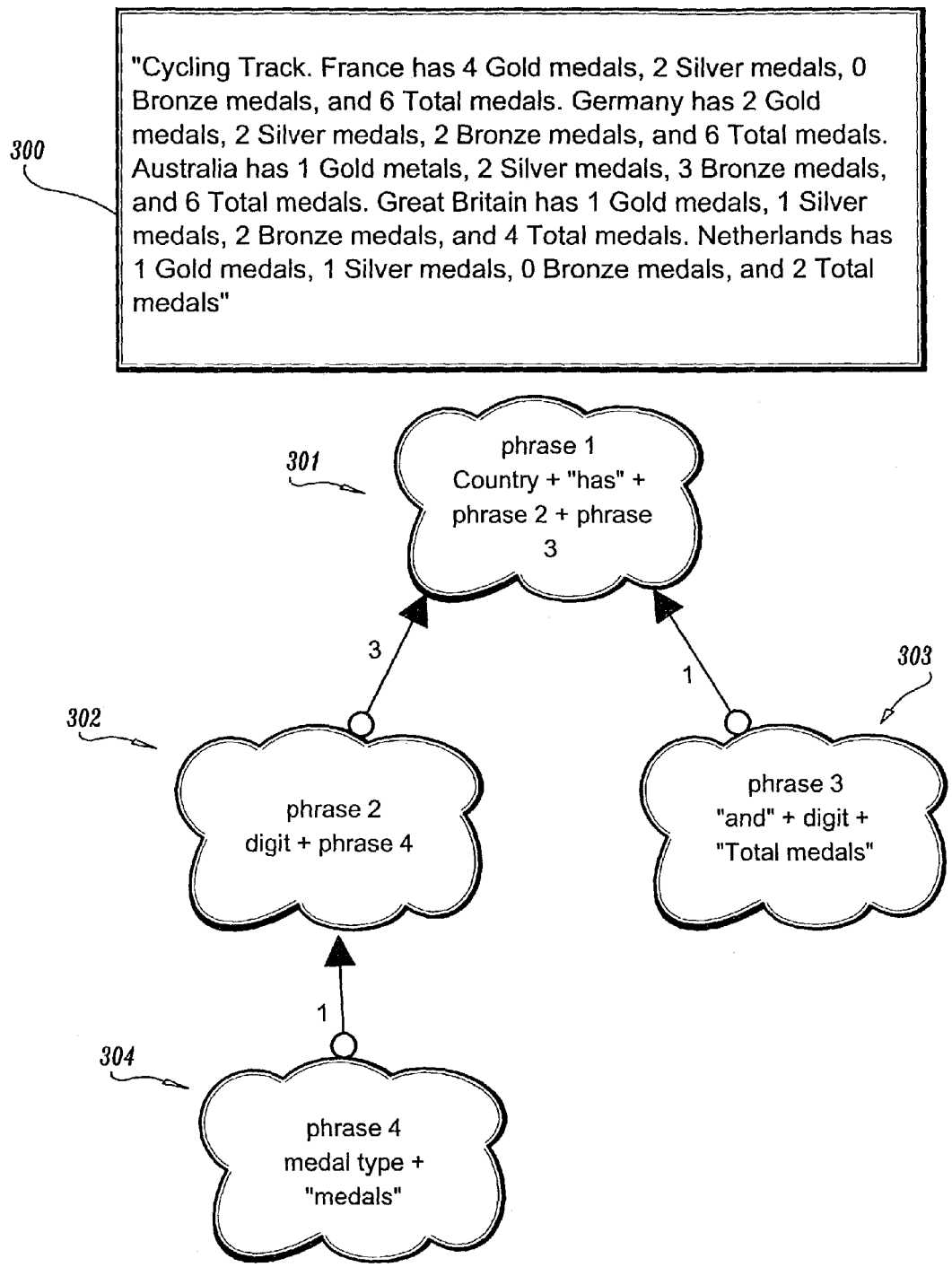
FIG. 3 is a Booch diagram according to an embodiment of the present invention.

Each TTPML template can include a title and a body, collectively called components. These components are similar to one another with respect to specification rules, but distinguishing their contribution to the output text provides flexibility in handling the content. For example, in browsing actions like scrolling, the speech-enabled browser can provide feedback to the user by rendering only the title component. In addition, a TTPML implementation can apply standard pronunciation rules for the components, for example, pausing before and after the title. FIG. 3 illustrates the phrase structure of a TTPML template for the Cycling Results table in FIG. 1. The title is not shown in this example. The body of the template 201 has a parent phrase and two embedded phrases 202 & 203, one of which includes an additional embedded phrase 204.

The output text can be produced by the progressive evaluation of each phrase specified in the table's TTPML template. A phrase can be evaluated by traversing its region and emitting text for each of the cells encountered, according to the phrase model. The output text corresponding to a cell content can be the result of some text processing, such as selecting only the first word, or expanding an abbreviation. In the iterative process of phrase evaluation, "current cell" denotes the table cell that is evaluated in the current iteration. A phrase can comprise multiple alternative models, which can be rendered based on the presence or absence of cell content and on the progressive evaluation of embedded phrases.

Phrase regions can be specified by a starting point and a span, e.g., a number of positions in each of the table's dimensions. Positions can be indicated as absolute or relative Cartesian coordinates. The start point can be defined with respect to the first row, first column in the table (e.g., (0,0)). For embedded tables or subordinate phrases, the start point and span can be defined relative to the location of the current cell in a specified ancestral phrase. This location can be denoted by the inherited position indicator, represented by the character "*" (indicating inheritance is bequeathed by the immediate ancestor), or by the identifier of the relevant ancestral phrase. When used in the position where a row is expected, the inherited position indicator denotes the current row of the enclosing phrase, and similarly for columns. Arithmetic expressions can be combined with the inherited position indicator to form a relative coordinate. For example, the location "*+1, 4" refers to "row (current plus 1), column 4".

The design of the TTPML template for an HTML table can be part of the content design process. The content designer can start from the desired structure of the output text and identify the repetitive and the unique elements. Referring to FIG. 3 for example, for the Cycling Results Table, the target output text 300 can be defined. The unique element is the title segment, "Cycling Track". The highest-level repetitive element is the segment describing each country's results, such as "X has Y Gold Medals, Z Silver Medals, V Bronze medals, and T Total medals". The repetition corresponds to iteration over the cells corresponding to country names. A phrase, "phrase_1", can be associated with this repetitive element, and analysis proceeds to identifying its repetitive and unique elements.

At the next level, one can identify a unique element "X has", a repetitive element "Y TYPE medals," varying with medal type, and a unique element "and T total medals." Phrases can be associated with the repetitive structure ("phrase_2") and the final unique element ("phrase_3"). Both phrases have no repetitive structures. However, "phrase_2" needs further decomposition because it comprises the value of two table cells; the number of medals and the corresponding medal type. As a result, the cell representing the medal type and the associated ornament "medals" are grouped in a new embedded phrase ("phrase_4").

This example provides an illustration of how TTPML enables content designers can improve the usability of the HTML aural presentations by ornamentation and contextual reinforcement. Ornamentation can be used to assist the formulation of grammatically correct sentences. Thus, the presentation can be more easily understood by the user. For example, the ornament "has" in phrase_1 helps create a grammatically correct sentence and reinforces the concept of "being awarded". Further, the ability to combine and repeat cell content as enabled by embedded phrases, allows the content designer to provide the user with a clear understanding of the relationships among the various pieces of information extracted from the table. For example, repeating the medal types throughout the presentation helps the user make a better association between numbers and types of awarded medals. In addition, transformation rules provide a means by which text can be presented in a more intelligible fashion. Ornaments can also comprise punctuation marks, which act as phrasing cues to text-to-speech engines.

Referring again to FIG. 3, the design of a TTPML template can be seen as a collection of objects of the types "Phrase", "Ornament", and "Cell". These objects have some attributes, such as row and column positions, which can be inherited from ancestral objects. Phrase objects can also aggregate subordinate objects such as Ornament objects, Cell objects, and other Phrase objects. Five instances of the object Phrase_1 301 of the type Phrase are shown. Each of these instances aggregates three instances of the object Phrase_2 302 and one instance of the object Phrase_3 303, all of which are of the type Phrase. Also aggregated into each Phrase_1 301 instance is an instance of a Cell object and an instance of an Ornament object. Each instance of the object Phrase_2 302 aggregates an instance of the object type Cell as well as an instance of the object Phrase_4 304 of the type Phrase. The Phrase_4 304 object instance aggregates an instance of a Cell object and an instance of an Ornament object. Further still, each Phrase_3 303 object instance (hierarchical peers of Phrase_2 203 instances) aggregate a Cell object and two Ornament objects. The application of an object-oriented paradigm to TTPML template construction can be technically useful. However, the authoring tool can also shield content creators from the complexities inherent to object-oriented design.

Figure 4:
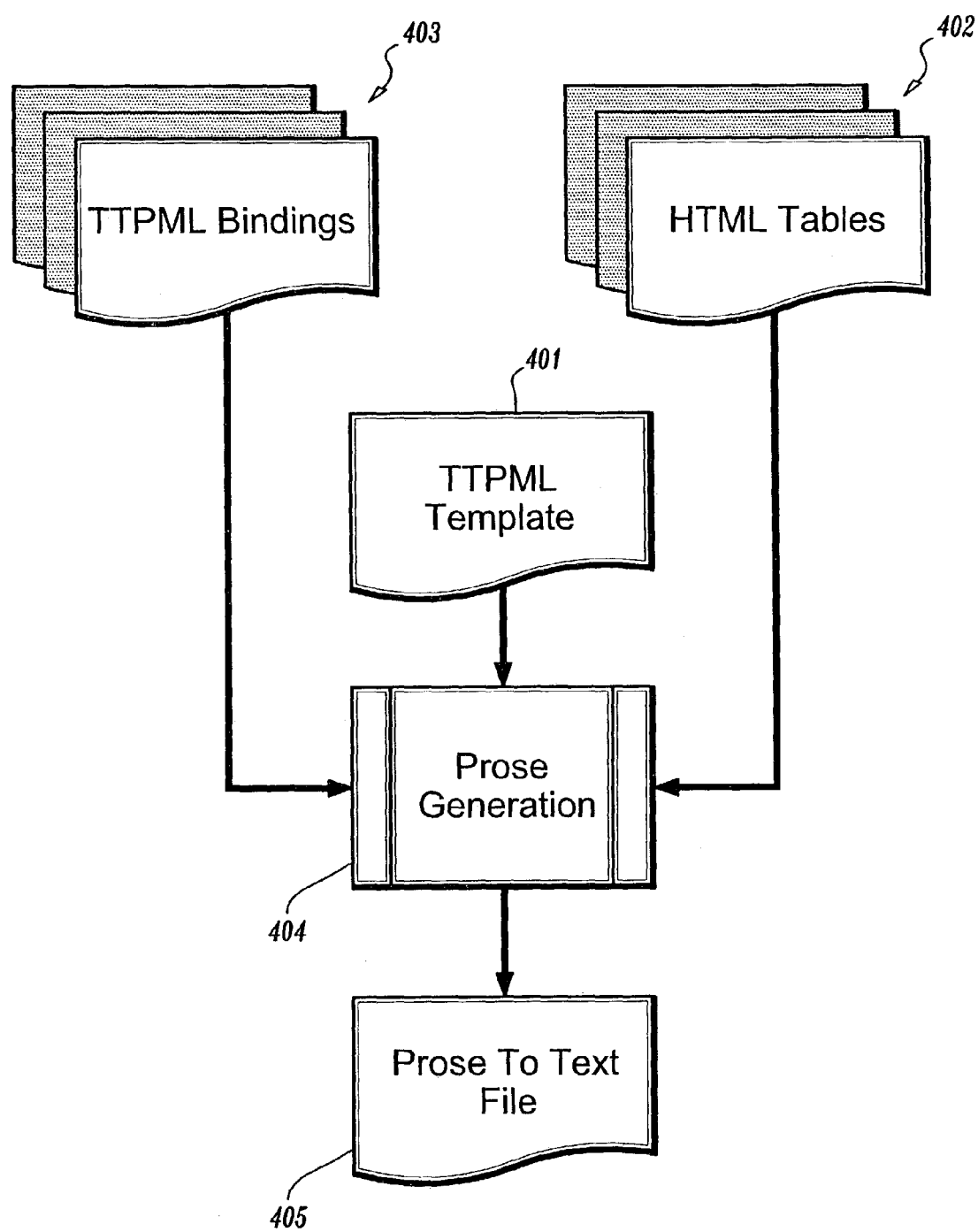
FIG. 4 is a flow chart of a method according to an embodiment of the present invention.

Referring to FIG. 4, TTPML templates 401 can be used with multiple HTML tables 402 sharing similar structures and semantics. Because of the way row and column traversal works, each table need only have a common layout, but can have a different number of rows and/or columns (for example, to handle scoring tables with a different number of rounds, or a different number of contestants).

TTPML templates 401 can be defined in separate files and associated with HTML files 402 and their tables through special TTPML or HTML tags 403, or system specific name conventions.

TTPML provides the tags TABLEDEF, INSTANCE, and TEMPLATE 403 to effect binding of TTPML templates to HTML source documents. The TTPML language is described in U.S. patent application Ser. No. 10/317,808, entitled "Method And Associated Elements For Generating Text From Tables", incorporated herein by reference in its entirety.

The authoring tool is intended to assist content creators in the specification of TTPML templates. In graphical representations of the TTPML templates, a specified sample table can be presented to the content creator. According to one embodiment of the invention, the content creator can be prompted to select table cells and ranges of cells and ascribe attributes to them. According to an embodiment of the invention, the content creator can be prompted to select a sample input table and then to prepare an example prose rendition, or prose model, of the table. The authoring tool can analyze the example prose rendition in light of the selected sample table and generates an appropriate TTPML script that will, when applied to input tables of the same type as the selected sample, produce appropriate output prose 404–405.

According to an embodiment of the present invention, the authoring tool integrates an HTML parser, an inductive learning engine (e.g., the authoring tool), and TTPML markup executions. The HTML parser can be, for example, from the javax. swing package of Java 1.3. The HTML parser can be used to parse the table markup into a canonical form that is used for the execution of the inductive learning and TTPML markup. An inductive learning engine can be used to obtain example outputs and match them against selected input tables in order to generate appropriate TTPML. The inductive learning engine can be, for example, written using IBM Java 1.3. The TTPML markup can be parsed and executed, wherein the specified transformations can be validated. The TTPML markup can be parsed and executed by, for example, a SAX parser (built with the Xerces package from Apache's Jakarta project). Because TTPML is XML compliant, it can be parsed by the aforementioned SAX parser, or any other suitable parser.

The intermediate forms of the TTPML and HTML can be used as inputs to the authoring tool. The authoring tool parses the HTML input to extract a sample input table for the authoring process. The inductive learning engine takes a natural language string and matches it to the sample input table to generate a TTPML template. For example, the authoring tool can prompt a content creator to enter a complete prose model, such as "Fra has 4 Gold medals, 2 Silver medals, 0 Bronze medals, and 6 Total medals.", from which appropriate TTPML can be automatically generated. The authoring tool can parse the TTPML template and apply the TTPML to the sample HTML to display a sample prose output to the author for validation.

The prose implicitly specifies the direction of table traversal, phrase hierarchy, and ornamentation. The authoring tool reverses the process of object-oriented design: an output equivalent can be used to derive object instances which are in turn aggregated to form an object hierarchy.

The additional feature can prompt the content creator to select blocks of cells in sequence. These cells can be added to the model. In this manner, cells are added to the model explicitly and do not need disambiguation. To continue with the Cycling example, the user selects the cells belonging to the country column and copies into the model. The user can select the block of columns and rows containing medal quantities, followed by the medal types followed by the total quantity column, and finally followed by the column heading "Total". The model can comprise the text "Fra 4 Gold 6 Total". The user can provide additional ornamentation to produce a grammatically correct prose string, e.g., "Fra has 4 Gold medals, and 6 Total medals." The authoring tool can prompt the user to disambiguate ornamentation as appropriate. For example, indicating to a user that a selection needs to be made as to whether "has" belongs with "Fra" or with "4".

The prose model can be used to derive the linearity of table traversal. The phrase hierarchy can be determined by examining the characteristics of the underlying cells that correspond to the prose model, taking into account the selection of explicit blocks of cells by the user.

The authoring tool can rely on limited background knowledge or rules, such as the rules "in English prose, dependent phrases are placed to the right of ancestral phrases" and "objects which share common attributes can be peers". The authoring tool can evaluate a positive example (a sample prose description of a sample table) in light of the background knowledge to yield a TTPML script such that when the script is applied to tables of the same type as the example table, the result will be an appropriate equivalent to the example prose. A table of substantially the same type can have a different number of columns and/or rows. The table can be navigated in a similar way as the sample table and the ornamentation established for the sample table is appropriate for the table. For example, the table of medals awarded in a cycling competition, as shown in FIG. 1, would be substantially similar to any table used in any Olympic event. The tool accepts as input a sample HTML table (FIG. 5), and an example output prose string (FIG. 6).

The example prose string can be mapped to the sample table to relate data contained in the example to cell values contained in the table. Alternatively, the user can explicitly map the relationships by means of a GUI "drag and drop" function provided by the authoring tool. Prose elements that do not match cell values are used to create Ornament objects as shown in FIG. 7.

When adjacent words do not match a cell value, such as "medals, and", the author can be prompted as to whether the words should be combined into a single ornament.

Prose elements that do match cell values are used to create Phrase objects. Recall that Phrase objects can aggregate Ornament objects. If the relationship of Ornament objects to Phrase objects is ambiguous, the user can be prompted to specify the relationship. For example, the user can be presented with a window for the purpose of selecting whether the ornamental verb "has" belongs to the "Fra" phrase or the "4" phrase. Note that if "has" is aggregated with the phrase "4 Gold medals," to form "has 4 Gold medals," the symmetry of "Gold medals, . . . Silver medals, . . . and Bronze medals," can be lost. However, if the transitive verb "has" is associated with the noun "Fra(nce)" the symmetry of the dependent clauses is maintained.

The tool groups similar Phrase objects based on their ownership of ornament objects as well as by the relative positioning and trajectory of traversal of the phrase objects' associated cells, as illustrated in FIG. 8. Since English prose proceeds left-to-right, is can be assumed that children and peers will be located to the right of parents. The authoring tool aggregates objects from right-to-left, collecting peers and children as it goes.

Proceeding from right to left, "Bronze" located at (1,3), "Silver" located at (1,2), and "Gold" located at (1,1) each are followed by a "medals," instances, they lie on the same vector, they can be considered instantiations of a Phrase object labels "T8".

Again proceeding right-to-left, "0" located at (2,3), "2" located at (2,2), and "4" located at (2,1) each are followed by a "T8" instance, they lie on the same vector, the trajectories to their children "T8"'s are identical (1,0), and so they can be considered instantiations of a Phrase object labeled, for example, "T9". Since the Column trajectory from "T9" to child "T8" is zero, "T8" can inherit "T9"'s column positions.

Figure 9:
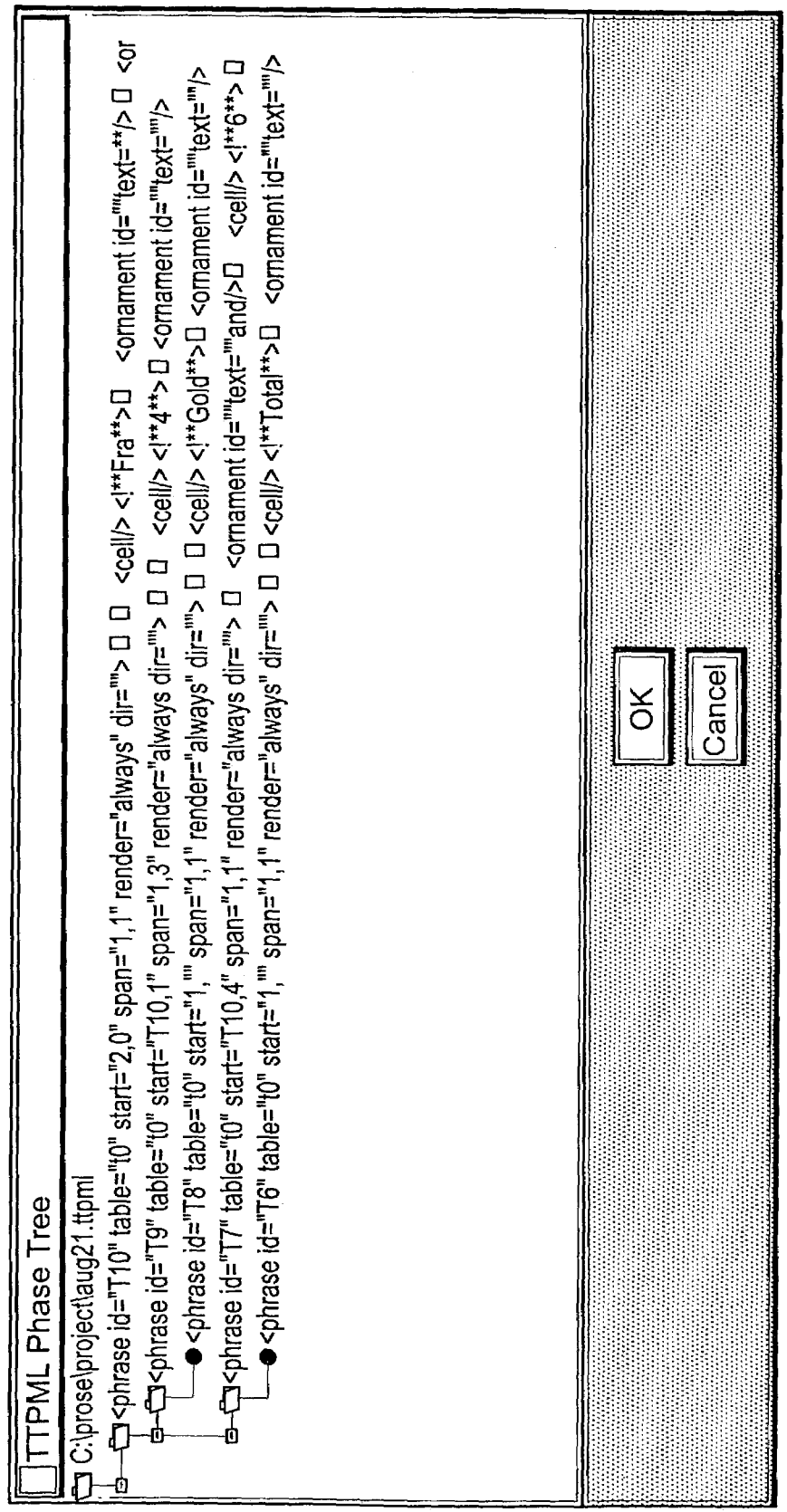
FIG. 9 is an illustration of a hierarchical tree according to an embodiment of the present invention.

Phrase object groups are then organized into a hierarchy, for example, as shown in FIG. 9. The hierarchy can be derived from an examination of the linearity of the prose example in conjunction with the relative spatial positioning of their associated cells.

The tool creates the markup language script based on its knowledge of Phrase objects, their hierarchy, relative positioning and iteration, and their associated Ornament objects.

The tool applies the new markup language script to the sample table and displays the resultant prose string to the user for validation. The user can edit the script to further refine the script and finally save the resultant script to a file for future use.

The following is an example of a resulting TTPML template, as displayed for user validation and editing:

```xml
<?xml version="1.0"?>
<!DOCTYPE ttpml SYSTEM "ttpml.dtd">
<ttpml language="en-us" encoding="??" age="adult" gender="female">
    <!-- Define the table instances -->
    <tabledef sourcedoc="file:/C:/prose/project/bike3.html" sourcetable="table1" id="t0"/>
    <instance bind="t0" as="t0" to="cycling"/>
    <template id="cycling">
        <phrase id="T10" table="t0" start="2,0" span="1,1" render="always" dir=" ">
                <cell/> <!--Fra-->
        <ornament id=" " text=" "/>
        <ornament id=" " text="has "/>
                <phrase id="T9" table="t0" start="T10,1" span="1,3" render="always" dir=" ">
                    <cell/> <!--4-->
                <ornament id=" " text=" "/>
                    <phrase id="T8" table="t0" start="1,*" span="1,1" render="always" dir=" ">
                        <cell/> <!--Gold-->
                    <ornament id=" " text=" "/>
                    <ornament id=" " text="medals, "/>
                </phrase>
            </phrase>
            <phrase id="T7" table="t0" start="T10,4" span="1,1" render="always" dir=" ">
                <ornament id=" " text="and "/>
                    <cell/> <!--6-->
                <ornament id=" " text=" "/>
                    <phrase id="T6" table="t0" start="1,*" span="1,1" render="always" dir=" ">
                        <cell/> <!--Total-->
                    <ornament id=" " text=" "/>
                    <ornament id=" " text="medals. "/>
                </phrase>
            </phrase>
        </phrase>
    </template>
</ttpml>
```

Figure 10:
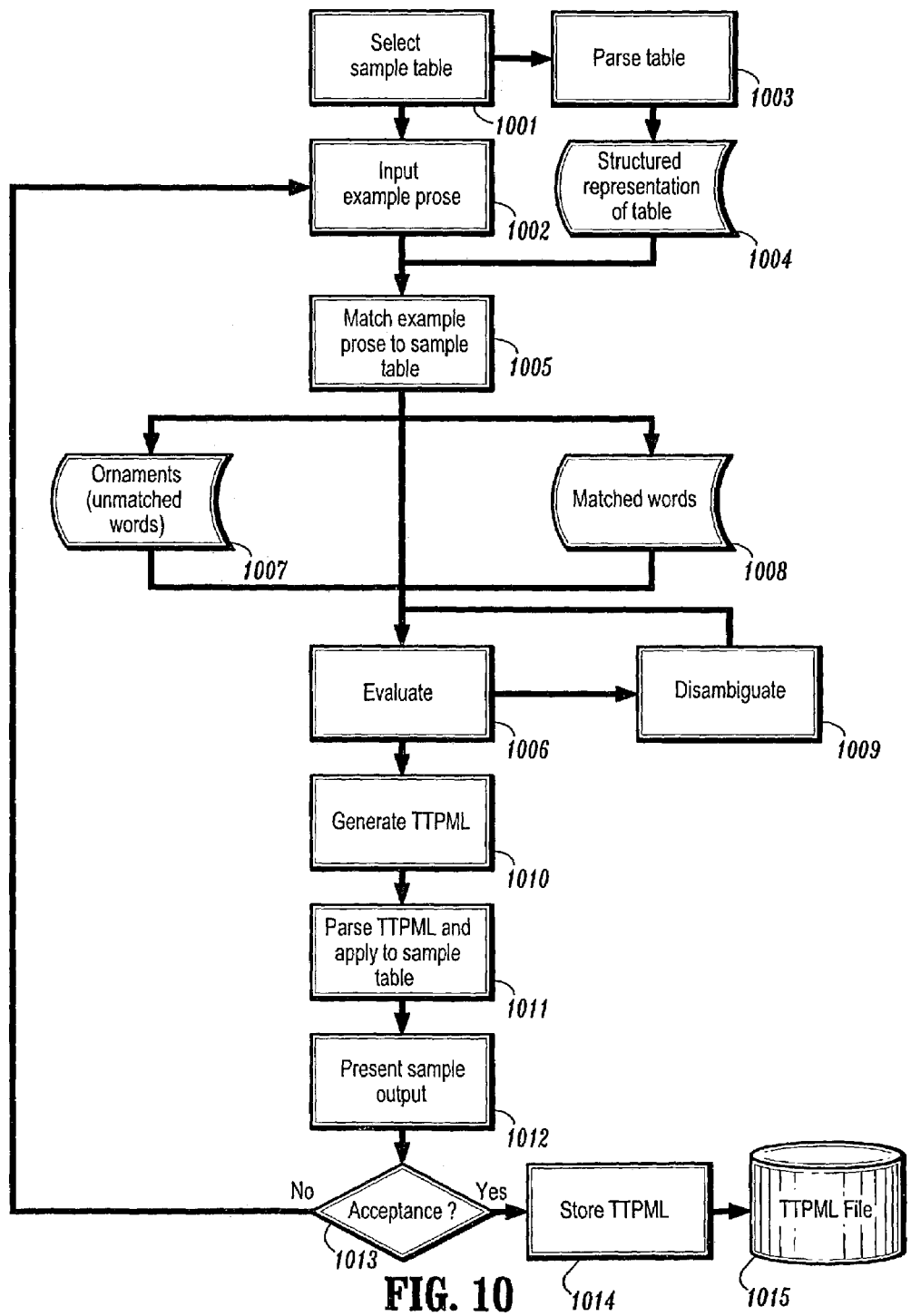
FIG. 10 is a flow chart of a method according to an embodiment of the present invention.

Referring to FIG. 10, a tool can be used for generation of rules to convert tabular information to prose form. An author can use the tool to prepare a model 1002 of the desired prose output of a sample table 1001. The sample table is parsed 1003, forming a structured representation of the sample table 1004. Using inductive learning, the tool maps the modeled prose to the sample table 1005 and generates a TTPML template 1010. Mapping comprises matching the model (e.g., prose) to the sample table and determining ornaments 1007 and matched words 1008. The mapping is a TTPML template that can be evaluated 1006 and disambiguated 1009 if needed, for example, as determined by the author. The TTPML template is parsed and applied to the sample table 1011 such that a result can be presented to the author 1012 for acceptance 1013. Further models can be input 1002. Upon acceptance, the TTPML template can be stored 1014, for example, to a file 1015.

Figure 11:
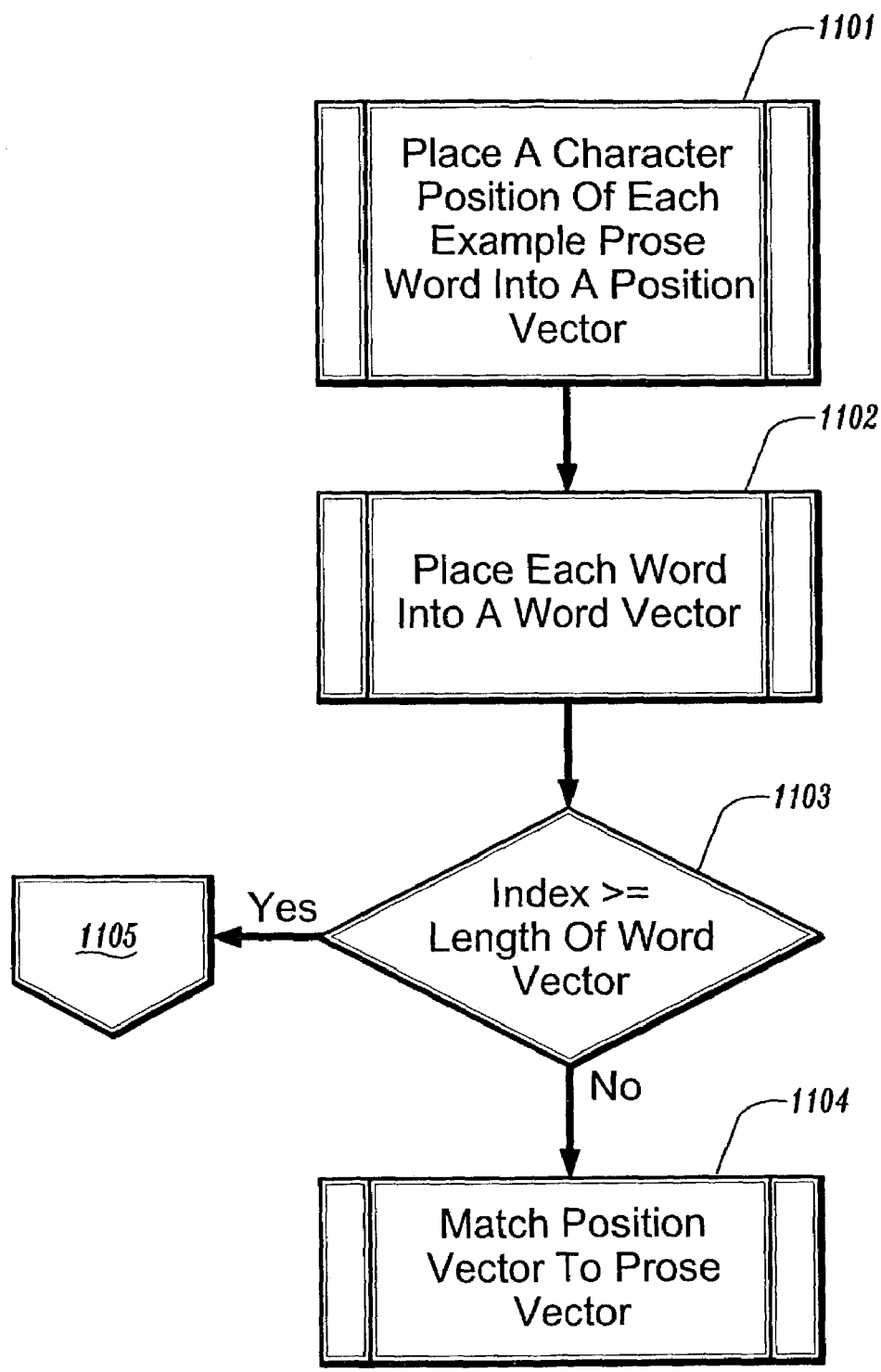
FIG. 11 is a flow chart of a method according to an embodiment of the present invention.

Referring to FIG. 11, matching the example prose to the sample table 1005 further comprises reading the example prose from left to right, placing a character position of each example prose word into a position vector 1101. The character position can be, for example, a position of the first letter of each word. From right to left, each word is placed into a word vector 1102. An index is used to traverse the word vector 1103. The index can be initialized to zero and increment up to the number of words in the word vector. The method determines whether a word of the word vector matches any words of the content of the sample table, or a user defined table 1104. Based on the determined matches, a TTPML prose is generated 1105.

Figure 12:
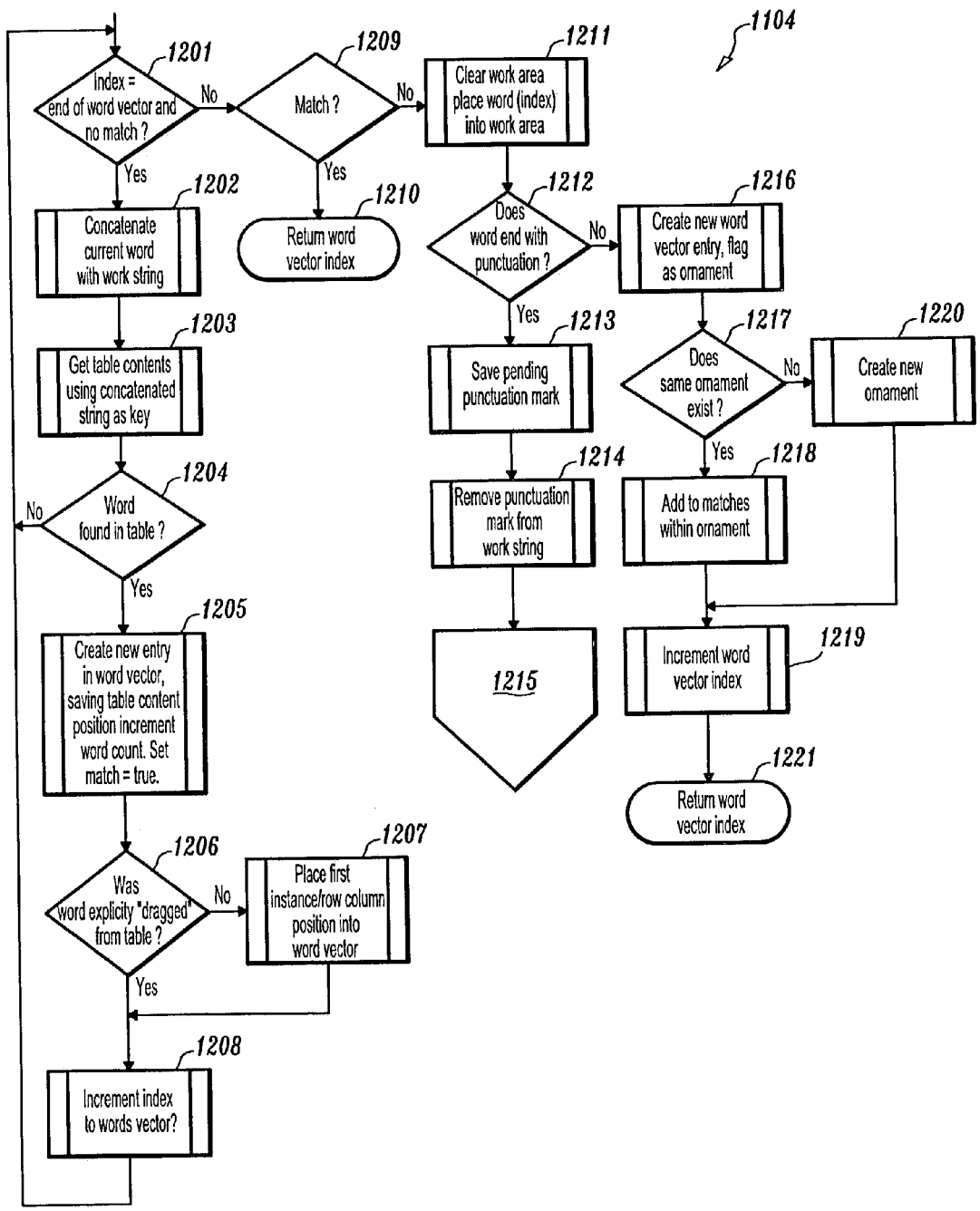
FIG. 12 is a flow chart of a method according to an embodiment of the present invention.

Referring to FIG. 12, to determine a match, the method determines whether the index is equal to the end of the word vector and whether a match flag equal to "no " 1201. If either the end of the word vector has not been reached or a match was determined on a prior pass 1201, the method checks whether a match was determined 1209. If a match was determined the word vector index is returned to block 1103 in FIG. 11. If no match was determined then a next word in the word vector is selected 1211. The method determines whether the word ends with a punctuation 1212 and if not, creates a new entry in the word vector, which is flagged as an ornament 1213. The method determines whether the same ornament already exists 1217, and if so, adds the word to matches within an existing ornament set 1218. That is, an ornament is created for each entry in the word vector, wherein a set of like ornaments can be grouped and aggregated. If the ornament does not exists, a new ornament is created 1219. The word vector index is incremented to a next word 1220 and the word vector is returned to block 1103 in FIG. 11. If the word does end in a punctuation mark, the marks is saved 1212 and removed from the string 1214.

Figure 13:
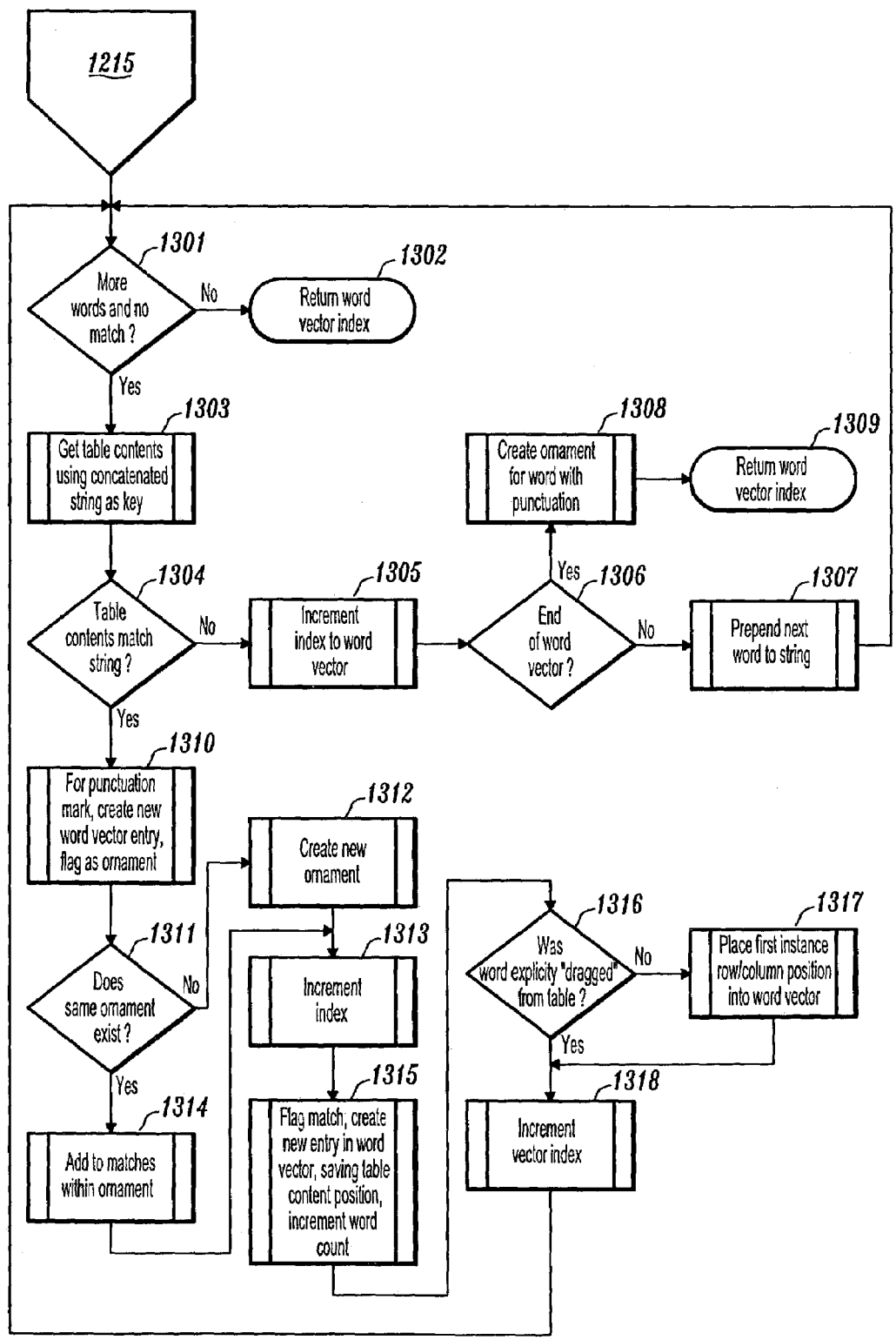
FIG. 13 is a flow chart of a method according to an embodiment of the present invention.

Referring to FIG. 13, the method determines whether there are additional words in the word vector 1301, and if not returns the word vector 1303 to block 1103 in FIG. 11. If additional words are present in the word vector the contents of the sample table are retrieved using a concatenated string of words from the word vector as a key 1303. The contents of the table are matched against the concatenated string 1304. If no match is determined the index is incremented 1305. The method determines whether the end of the word vector has been reached 1306 and if not, adds the next word in the word vector to the string 1307. If the end of the vector has been reached, an ornament for any words with punctuation is created 1308 and the word vector is returned to block 1103 in FIG. 11. If a match was determined in block 1304, a new word is entered into the vector for each punctuation mark 1310. The method determines whether the same ornament already exists 1311, and if not, creates a new ornament 1312. If the ornament does exist, then the mark is added to the matches with the ornament 1314. The index is incremented 1313 to the next word in the vector. Any match is flagged and a new entry in the word vector is made 1315. The method determines whether the current word (e.g., as indicated by the index) was dragged from the table and into the example of text 1316, for example, by a user using a graphical user interface with copy and paste functions. If the word or punctuation was not dragged, it is placed in the word vector as a first instance 1317. The index is incremented to point to the next word in the word vector 1318 and the method continues at block 1301.

Figure 14:
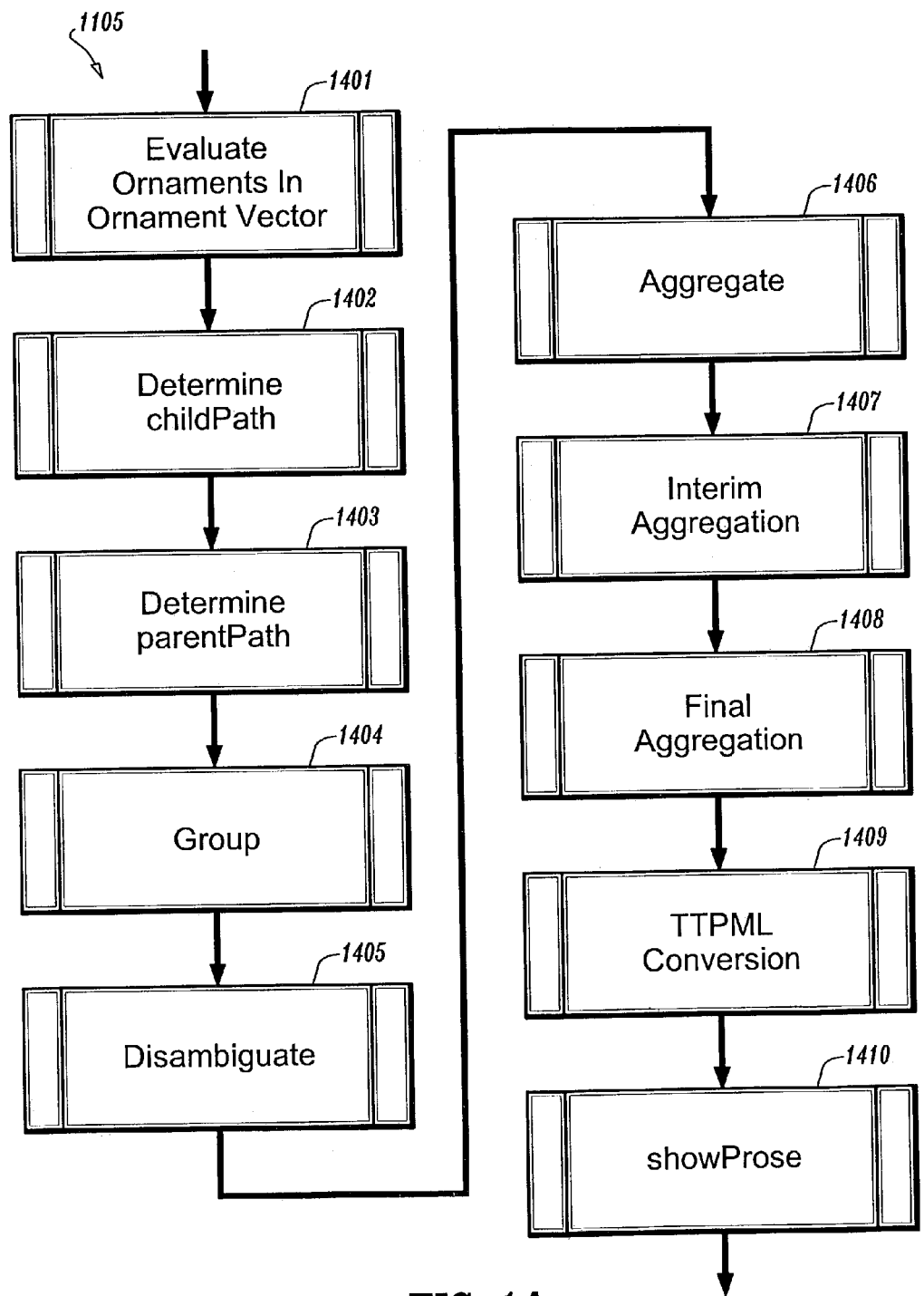
FIG. 14 is a flow chart of a method according to an embodiment of the present invention.

Upon determining that the index is greater than or equal to the length of the vector 1103, the method continues to generate the TTPML prose 1105. Referring to FIG. 14, each ornament is evaluated, beginning from the left most ornament in the string of concatenated ornaments 1401, wherein a childpath and a parentPath are determined (1402 and 1403 respectively). Phrase elements, for example, including ornaments and/or phrases, are grouped into phrases 1404, including assigning the matched values and the unmatched values to phrases. The method disambiguates the groups 1405, if any where made. The phrases are aggregated 1406. The phrases can be recursively aggregated, for example, grouping phrases into an interim aggregation 1407. The aggregation can organized into a hierarchy of phrase entities. The method determines whether each group or phrase entity is a child of any other group, and if not determines a final aggregation 1408 and performs a TTPML conversion, appending the TTPML of each group to a string 1409. The converted prose can be displayed 1410 and/or saved to a file.

The TTPML template can be used to generate prose renditions of tabular information. The author is sheltered from the need to understand the complexity of the TTPML phrasing hierarchy. TTPML provides a method for improving the accessibility of aurally rendered HTML tables. Speech-enabled browsers are limited in their presentation of HTML tables by the lack of contextual information and by copyright law regulations. To overcome these limitations, the proposed method enables content providers to associate each table with a set of rules for table-to-prose transformation that browsers or other content processing tools can use in their renderings. The rules, described in TTPML, a new XML-based language, can indicate contextual reinforcement, ornamentation, sequence of presentation, and pronunciation guidelines.

When applied at an origin server or at a proxy server, the proposed method can be used by content providers interested in delivering content in both text and sound formats. TTPML-based transformation can be used to automatically compose sound objects upon (HTML) content updates. These objects can be "watermarked", can be compressed, and can be stored for subsequent delivery and presentation to the user.

Having described preferred embodiments of a method for specifying rules for contextual reinforcement, ornamentation, cell content transformation, and traversal sequence, it is noted that modifications and variations can be made by persons skilled in the art in light of the above teachings. It is therefore to be understood that changes can be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for preparing rules used for generating text to describe structured data comprising the steps of:
   providing a sample of structured data;
   providing a text corresponding to the sample of structured data to a pattern matching learning engine, the text comprising at least one value from within the sample of structured data;
   organizing the text into a hierarchy of syntactic components; and
   building rules based on the text and the sample of structured data, wherein the rules define an organization of the hierarchy of syntactic components.

2. The method of claim 1, further comprising the steps of:
   applying the rules to a structured data to generate a text description of the structured data, wherein the structured data is of a substantially similar type as the sample of structured data; and
   presenting the text description to a user.

3. The method of claim 1, further comprising the step of storing the rules.

4. The method of claim 1, wherein the step of organizing comprises the steps of:
   determining values contained in the text which match values contained in the sample of structured data;
   determining values contained in the text which do not match values the sample of structured data;
   aggregating matched values and unmatched values into phrase entities;
   aggregating similar phrase entities; and
   organizing the phrase entities into a hierarchy of phrase entities.

5. The method of claim 4, further comprising the step of preparing a graphical representation of the hierarchy of phrase entities.

6. A method for preparing an example of text used to prepare rules for generating text to describe structured data comprising the steps of:
   presenting a graphical representation of the sample of structured data to a user;
   providing a data entry facility to the user; and
   capturing example text entered into the data entry facility, wherein the example text corresponds to the sample of structured data.

7. The method of claim 6, further comprising the steps of:
   applying a standardized rule to the sample of structured data to generate an initial text description of the structured data; and
   presenting the initial text description to a user.

8. A program storage device readable by machine, tangibly embodying a program of instructions executable by the machine to perform method steps for preparing rules used for generating text to describe structured data, the method steps comprising:
   providing a sample of structured data;
   providing a text corresponding to the sample of structured data to a pattern matching learning engine, the text comprising at least one value from within the sample of structured data;
   organizing the text into a hierarchy of syntactic components; and
   building rules based on the text and the sample of structured data, wherein the rules define an organization of the hierarchy of syntactic components.

9. The method of claim 8, further comprising the steps of:
   applying the rules to a structured data to generate a text description of the structured data, wherein the structured data is of a substantially similar type as the sample of structured data; and presenting the text description to a user.

10. The method of claim 8, further comprising the step of storing the rules.

11. The method of claim 8, wherein the step of organizing comprises the steps of:

determining values contained in the text which match values contained in the sample of structured data;

determining values contained in the text which do not match values the sample of structured data;

aggregating matched values and unmatched values into phrase entities;

aggregating similar phrase entities; and organizing the phrase entities into a hierarchy of phrase entities.

12. The method of claim 11, further comprising the step of preparing a graphical representation of the hierarchy of phrase entities.

* * * * *